United States Patent [19]

Wood

[11] 4,358,375
[45] Nov. 9, 1982

[54] FILTER PACK

[75] Inventor: Stanley D. Wood, Chester, Va.

[73] Assignee: Allied Corporation, Morris Township, N.J.

[21] Appl. No.: 74,279

[22] Filed: Sep. 11, 1979

[51] Int. Cl.³ .................... B01D 29/08; B01D 27/02
[52] U.S. Cl. .................................. 210/266; 210/350; 425/199
[58] Field of Search ....... 425/199; 210/266, DIG. 15, 210/351, 350

[56] References Cited

U.S. PATENT DOCUMENTS

| | | | |
|---|---|---|---|
| 661,189 | 11/1900 | Olsen et al. | 210/266 |
| 1,047,070 | 12/1912 | Kantrowitz | 210/351 |
| 2,266,363 | 12/1941 | Graves | 425/199 |
| 2,266,368 | 12/1941 | Hull et al. | 425/199 |
| 2,871,511 | 2/1959 | Speakman | 425/199 |
| 2,879,543 | 3/1959 | McDermott | 425/199 |
| 2,883,261 | 4/1959 | McGeorge, Jr. | 425/199 |
| 2,936,482 | 5/1960 | Kilian | 425/199 |
| 3,028,627 | 4/1962 | McCormick | 425/199 |
| 3,104,419 | 9/1963 | La Forge | 425/199 |
| 3,348,263 | 10/1967 | Carter | 425/199 |
| 3,488,806 | 1/1970 | De Cecco et al. | 425/199 |
| 3,630,384 | 12/1971 | Todo | 210/506 |
| 3,817,377 | 6/1974 | Piggot | 210/DIG. 15 |
| 3,891,379 | 6/1975 | Lenk | 425/464 |
| 4,077,880 | 3/1978 | Lorenz et al. | 210/65 |

Primary Examiner—Frank A. Spear, Jr.
Attorney, Agent, or Firm—Virginia S. Andrews

[57] ABSTRACT

A filter pack (20) and method of making the same are provided. Finely divided inert material (23) is bound in the filter pack (20) for use in a spin pot. Essential elements are a wall (21) which defines a cavity in which the finely divided inert material (23) is placed, a cap (26), a first cover (25), and a first screen member (24) comprised of at least one screen having a mesh size which prevents passage of the finely divided inert material therethrough but which allows passage of a fluid therethrough. The first screen member (24) forms a press fit between the wall (21) and the first cover (25) to cover the exposed portion of the cavity. The finely divided inert material (23) is compressed in the filter pack (20) by the intrusion of the first cover (25) and the first screen member (24) into the cavity occupied by the finely divided inert material (23). A reversible filter pack (20) is also provided in which each end of the cavity is closed by means of a press fit cover (25, 27), screen member (24, 26), and wall (21); intrusion of at least one of the covers and screen members into the cavity compresses the finely divided inert material therein.

12 Claims, 5 Drawing Figures

FILTER PACK

BACKGROUND OF THE INVENTION

1. Field of the Invention

This invention broadly relates to apparatus and method of forming the same for use in the production of synthetic filaments, more especially the melt extrusion of filaments from synthetic polymers such as polyester, polyamide and the like. More particularly, the present invention relates to a filter pack, in which finely divided inert material is bound, for use in a spin pot, and also to a method of binding a finely divided inert material to form a filter pack for use in a spin pot for the melt extrusion of filaments.

The term "inert material" refers to a material that is chemically resistant to or will not contaminate the melt being extruded, that will remain solid when exposed to extrusion temperatures, and that possess sufficient mechanical strength to avoid breaking down or rapid disintegration under conditions of use. Silica sand and glass beads are preferred inert materials for use.

2. Description of the Prior Art

Conventional spin pots comprise a top cap, a filter assembly, an optional perforated breaker plate which may be recessed to form the spin pack body, a spinnerette plate provided with a plurality of extrusion orifices, and a spin pack body.

Conventional filter assemblies may be formed by a series of fine metal gauzes or screens, sintered metal discs, finely divided inert material, and the like. Certain polymers, such as polyamide, experience processing problems when screen packs or sintered metal filters are utilized. This is believed to be due to the presence of gels in the molten polymer which cannot be filtered out, as they will eventually flow through even the finest screen filter if sufficient driving force is available. It is thought that when the gel particles encounter a screen or sintered metal filter the particles divide momentarily and reform as they pass through each screen layer or around the particles in the sintered metal filter. Thus, the gel particles arrive at the discharge of the filter in much the same size and shape as they entered. These particles cause defects in the yarn called nubs, which form weak points that limit the yarn's ability to be drawn and texturized. On the other hand, it is thought that when the gel particles encounter a filter of finely divided inert material, they are broken up by the relatively sharp edges of the material and do not reform due to the random nature of the polymer passages through the filter. Polymer melt spun through such a filter generally has fewer nubs and can be readily drawn and texturized. Microscopic examination of the yarn indicates that the amount of gel is about the same for a given length of filament; however, the gel particles are much smaller when the polymer has been filtered through finely divided inert material. Synthetic yarns are in great demand, even those produced from gel-contaminated polymers, and current polymer production techniques sometimes preclude eliminating the gel at the source. Therefore, filters comprised of finely divided inert material are essential in the production of yarns from these gel-bearing polymers.

A typical filter comprising finely divided inert material may be formed by locking several layers of wire screen into a filter ring or spin pack body by swaging a peripheral aluminum wire (e.g., staking ring) into a recess in the spin pack body or filter ring. Layers of graded, finely divided inert material are then poured into the cavity of the filter ring or spin pack body one layer at a time to form the filter. Loose screens and/or distribution plates may be placed on top of the material to help hold it in place, and screens may be used to separate the layers of finely divided inert material. These filters work reasonably well as long as the layers of finely divided inert material are not disturbed. However, if the filter ring is tilted, bumped, or set down heavily, the finely divided inert material will shift to form thick and thin spots in the filter and to intermix layers of the finely divided inert material if there are no separating screens. Further, after installation of the filter assembly in the spin pot, the spin pot itself must be installed in a spinning block and connected to a polymer source, and this is practically impossible to do without tilting or bumping the spin pot to thereby disturb and unevenly distribute the layers of finely divided inert material. This results in nonuniform flow of the material to be extruded, unequal residence times, uneven polymer distribution, and inferior performance.

Compression of the filter media (finely divided inert material) is known. See, e.g., U.S. Pat. Nos. 2,266,363 to Graves and 3,348,263 to Carter. However, as this compression is obtained by screwing or otherwise connecting the spin pot to the spin block or extrusion head, there is no provision for binding the finely divided inert material while handling the spin pot prior to its installation. Further, it is known to utilize screens which are held in place by a deformable metal ring to constrain a finely divided inert material (see U.S. Pat. No. 3,028,627 to McCormick); a problem associated with this type of constraint is the tendency of the finely divided inert material to creep out around the seal ring to plug the spinnerette orifices during operation.

SUMMARY OF THE INVENTION

The present invention provides a filter pack, in which finely divided inert material is bound, for use in a spin pot. The essential elements are a wall, a cap, a first cover, and a first screen member. The wall defines a cavity in which a finely divided inert material is placed. The cap has a plurality of apertures therethrough which are small enough to prevent passage of the finely divided inert material therethrough but which allow passage of a fluid therethrough, and retains the finely divided inert material in the cavity defined by the wall. The first cover allows passage of a fluid therethrough. A portion of the external periphery of the first cover has a shape similar to but slightly smaller than a matching portion of the internal periphery of the wall. The first screen member forms a press fit between the portion of the external periphery of the first cover and the portion of the internal periphery of the wall, and covers the exposed portion of the cavity. The first screen member comprises at least one screen having a mesh size which prevents passage of the finely divided inert material therethrough but which allows passage of a fluid therethrough. The finely divided inert material is compressed in the filter pack by the intrusion of the first cover and the first screen member into the cavity occupied by the finely divided inert material.

The wall may further comprise a flange intermediate the ends of and along the internal periphery of the wall. The cap and the first screen member would then abut, respectively, opposing sides of the flange.

It is preferred that the cap be a second screen member which comprises at least one screen having a mesh size be which prevents passage of the finely divided inert material therethrough but which allows passage of fluid therethrough. In this case, it is also preferred that the filter pack additionally comprise a second cover which allows passage of a fluid therethrough, the second screen member forming a press fit between the wall and the second cover.

The filter pack of the most preferred embodiment comprises a filter ring as the wall, a first distribution plate as the first cover, a first screen member, a second distribution plate, and a second screen member as the cap. The filter ring defines a cavity in which the finely divided inert material is located. The first distribution plate has a plurality of apertures therethrough and has an external periphery with a shape similar to but slightly smaller than the internal periphery of the filter ring. The first screen member forms a press fit between the first distribution plate (first cover) and the filter ring (wall) to create pressure on the finely divided inert material at one end of the filter ring. The first screen member has a thickness slightly greater than the distance between the internal periphery of the filter ring and the external periphery of the first distribution plate. The first screen member comprises at least one screen having a mesh size which prevents passage of the finely divided inert material therethrough but which allows passage of a fluid therethrough. The second distribution plate has a plurality of apertures therethrough and has an external periphery with a shape similar to but slightly smaller than the internal periphery of the filter ring. The second screen member (cap) forms a press fit between the second distribution plate and the filter ring to create pressure on the finely divided inert material at the other end of the filter ring. The second screen member (cap) also has a thickness slightly greater than the distance between the internal periphery of the filter ring and the external periphery of the second distribution plate, and comprises at least one screen having a mesh size which prevents passage of the finely divided inert material therethrough but which allows passage of a fluid therethrough. The finely divided inert material is compressed and held in the filter pack by the intrusion of the first distribution plate and the first screen member and the intrusion of the second cover and the second screen member into the cavity occupied by the finely divided inert material.

The present invention also provides a method of binding finely divided inert material to form a filter pack for use in a spin pot. The method comprises the steps of:

a. substantially filling with a finely divided inert material the cavity formed by a wall and a cap, the cap allowing passage of a fluid therethrough;

b. covering the finely divided inert material with a screen member which comprises at least one screen having a mesh size which prevents passage of the finely divided inert material therethrough but which allows passage of a fluid therethrough;

c. placing a cover on the screen member, a portion of the external periphery of the cover having a shape similar to but slightly smaller than a matching portion of the internal periphery of the wall, the cover allowing passage of fluid therethrough, and the screen member having a thickness slightly greater than the distance between the periphery of the cover and the periphery of the wall; and d. applying sufficient pressure to the cover to simultaneously compress the edges of the screen member between the portion of the external periphery of the cover and the matching portion of the internal periphery of the wall and cause the intrusion of the cover and the screen member into the cavity occupied by the finely divided inert material to compress and bind the finely divided inert material in place.

A more preferred method of binding a finely divided inert material to form a filter pack comprises the steps of:

a. covering one end of a cavity formed by a wall open at both ends with a first screen member which comprises at least one screen having a mesh size which prevents passage of a finely divided inert material therethrough but which allows passage of a fluid therethrough;

b. placing a first cover, which has an external periphery with a shape similar to but slightly smaller than the internal periphery of the wall and which allows passage of fluid therethrough, over the first screen member, the first screen member having a thickness slightly greater than the distance between the external periphery of the first cover and the internal periphery of the wall;

c. applying sufficient pressure to the first cover to compress the edges of the first screen member between the external periphery of the first cover and the internal periphery of the wall;

d. substantially filling with finely divided inert material the cavity formed by the wall, the first screen member, and the first cover;

e. covering the finely divided inert material with a second screen member which comprises at least one screen having a mesh size which prevents passage of the finely divided inert material therethrough but which allows passage of a fluid therethrough;

f. placing a second cover, which has an external periphery with a shape similar to but slightly smaller than the internal periphery of the wall and which allows passage of a fluid therethrough, over the second screen member, the second screen member having a thickness slightly greater than the distance between the external periphery of the second cover and the internal periphery of the wall; and g. applying sufficient pressure to the second cover to simultaneously compress the edges of the second screen member between the external periphery of the second cover and the internal periphery of the wall and cause the intrusion of the second cover and the second screen member into the cavity occupied by the finely divided inert material to compress and bind the finely divided inert material in place.

BRIEF DESCRIPTION OF THE DRAWINGS

In the accompanying drawings

DETAILED DESCRIPTION OF THE DRAWINGS

Figure 1:
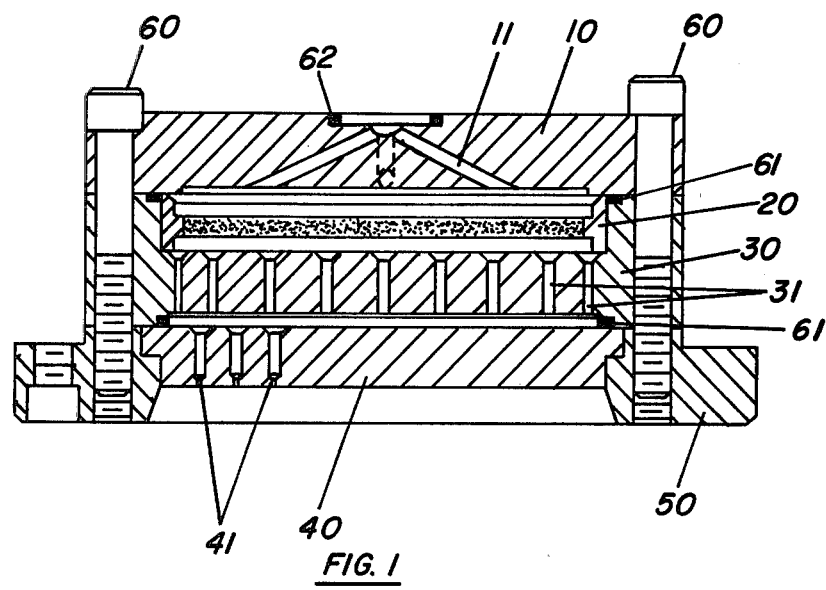
FIG. 1 is a sectional view through a spin pot.

In the accompanying drawings, like numbers refer to like apparatus. FIG. 1 depicts the reversible filter pack 20 of the present invention in a spin pot comprised of superimposed top cap 10 with distribution channels 11, filter pack 20, breaker plate 30 with channels 31, spinnerette 40 with extrusion orifices 41, and clamping ring 50, connected by, for example, bolts 60, and sealed with suitable gaskets 61, between the top cap, breaker plate and spinnerette. Gasket 62 forms the seal between the pot and the polymer supply channel.

The preferred gaskets are spiral wound stainless steel, graphite filled gaskets such as those made by the Flexitallic Gasket Company, Inc. Stainless steel O-rings are a suitable gasket. There are other types as well.

Operation of the spin pot is as follows. Molten polymer flows under high pressure into top cap 10 through a flow inlet passage and branches to flow through delivery channels 11 to a distribution space immediately above filter pack 20. At the distribution space the flow of the molten polymer is substantially laminar, and the face of filter pack 20 is evenly coated. From filter pack 20, the polymer flows through channels 31 of breaker plate 30 to a sealed distribution space between breaker plate 30 and spinnerette 40, and on to extrusion orifices 41 of spinnerette plate 40, from which the filaments are extruded.

Figure 2:
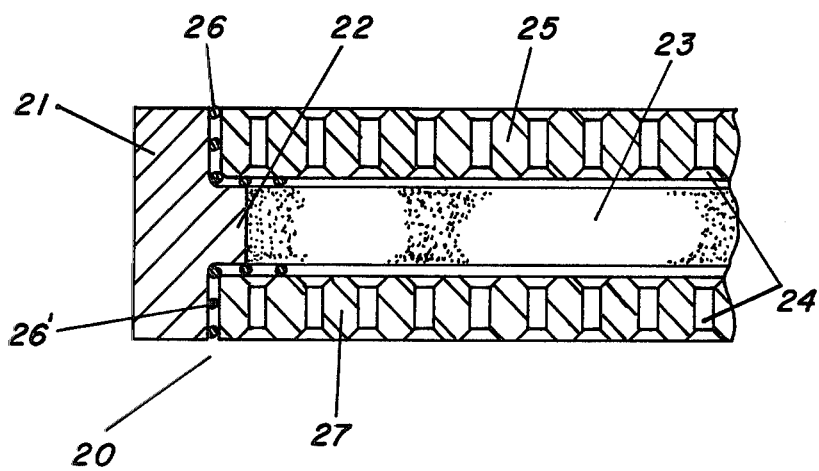
FIG. 2 is a detailed fragmentary view of a reversible filter pack of the present invention.

FIG. 2 shows a detailed fragmentary view of a reversible filter pack 20 which comprises a wall, a cap, a first cover and a first screen member. The wall, depicted as filter ring 21 with flange 22 intermediate the ends of and along the internal periphery of filter ring 21, defines a cavity in which finely divided inert material 23 is placed. The first cover, which allows passage of a fluid such as molten polymer therethrough, is shown as first distribution plate 25 with a plurality of distributing channels 24 therethrough. A portion of the external periphery of first distribution plate 25 has a shape similar to but slightly smaller than a matching portion of the internal periphery of filter ring 21. In FIG. 2, the external periphery of first distribution plate 25 is circular, as is the portion of the internal periphery above flange 22 of filter ring 21. First screen member 26 forms a press fit between the portion of the internal periphery above flange 22 of filter ring 21 and the external periphery of first distribution plate 25, and covers the exposed upper portion of the cavity which is occupied by finely divided inert material 23. First screen member 26 comprises at least one screen having a mesh size which prevents passage of finely divided inert material 23 therethrough but which allows passage of a fluid, such as molten polymer, therethrough. It is preferred that first screen member 26 comprise two screens of at least 200 mesh, the particles of finely divided inert material 23 being large enough to be retained by the screens. For ease in press fitting first screen member 26 between filter ring 21 and first distribution plate 25, the lower peripheral edge of first distribution plate 25 immediately above flange 22 is beveled at an angle of about 30° to 45°. With further reference to FIG. 2, the cap, depicted as second screen member 26', has a plurality of apertures therethrough which are small enough to prevent passage of finely divided inert material 23 therethrough but which allow passage of a fluid, here molten polymer, therethrough. Second screen member 26' comprises at least one screen the mesh of which provides the aforesaid apertures. It is preferred that second screen member 26' also comprise two screens of at least 200 mesh, the particles of finely divided inert material 23 being large enough to be retained by the screens. Finely divided inert material 23 is supported by second screen member 26' (the cap) in the cavity. It is preferred in this embodiment that filter pack 20 additionally comprise a second cover which allows passage of a fluid therethrough, depicted in FIG. 2 as second distribution plate 27 having polymer distributing channels 24 therethrough. A portion of the external periphery of second distribution plate 27 has a shape similar to but slightly smaller than a matching portion of the internal periphery of filter ring 21. In FIG. 2, the external periphery of second distribution plate 27 is circular, as is the portion of the internal periphery below flange 22 of filter ring 21. Second screen member 26' forms a press fit between the portion of the internal periphery below flange 22 of filter ring 21 and the external periphery of second distribution plate 27. A screen of from 20 to 100 mesh is preferably located between second screen member 26' and second distribution plate 27 to prevent the finer mesh screen from being extruded through the holes of second distribution plate 27 during the melt spin process. For ease in press fitting second screen member 26' between filter ring 21 and second distribution plate 27, the upper peripheral edge of second distribution plate 27 immediately below flange 22 is beveled at an angle of about 30° to 45°.

Finely divided inert material 23 can be layered with different degrees of fineness in each layer and/or with screens separating layers of the material. Also, first and second distribution plates 25 and 27 can have shapes other than circular, for example rectangular, elliptical, etc. It is preferred that first and second distribution plates 25 and 27 be circular and substantially identical. It should be noted that in this embodiment the diameters of distribution plates 25 and 27 are slightly smaller than the diameters of the corresponding portions of filter ring 21, i.e., the portions of the external peripheries of first and second distribution plates 25 and 27 have a shape similar to but smaller than the corresponding portions of the internal periphery of filter ring 21. First and second screen members 26 and 26' therefore have a thickness slightly greater than the respective distances between the external peripheries of the first and second distribution plates 25 and 27 and the corresponding portions of the internal periphery of filter ring 21. By way of explanation, this means that if first and second distribution plates 25 and 27 each have an outer diameter of 5 inches (12.7 cms.) and the corresponding portions of filter ring 21 have an internal diameter of 5.05 inches (12.8 cms.) then the distance between the corresponding portions of the internal periphery of filter ring 21 and the external peripheries of centered distribution plates 25 and 27 is 0.05/2 inch or 0.025 inch (0.084 cm.). Therefore, for purposes of this explanation, first and second screen members 26 and 26' would each have a thickness of slightly greater than 0.025 inch (0.084 cm.) in order to effectuate the press fit. It is also preferred that screen members 26 and 26', before they are press fit, each have a diameter which is larger than the inner diameter of filter ring 21 on either side of flange 22 by approximately twice the thickness of, respectively, distribution plates 25 and 27. Filter pack 20 is deemed "reversible" in that it makes no difference which distribution plate, 25 or 27, is assembled first. Only if finely divided inert material 23 is not layered can the filter pack be reversed in the spin pot.

Figure 4:
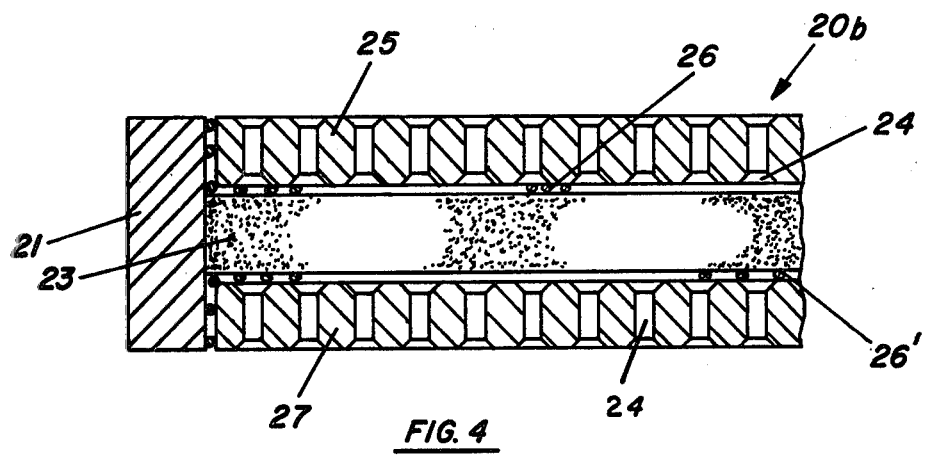
FIG. 4 is a view similar to FIG. 2 with the flange along the internal periphery of the filter ring omitted.
Figure 3:
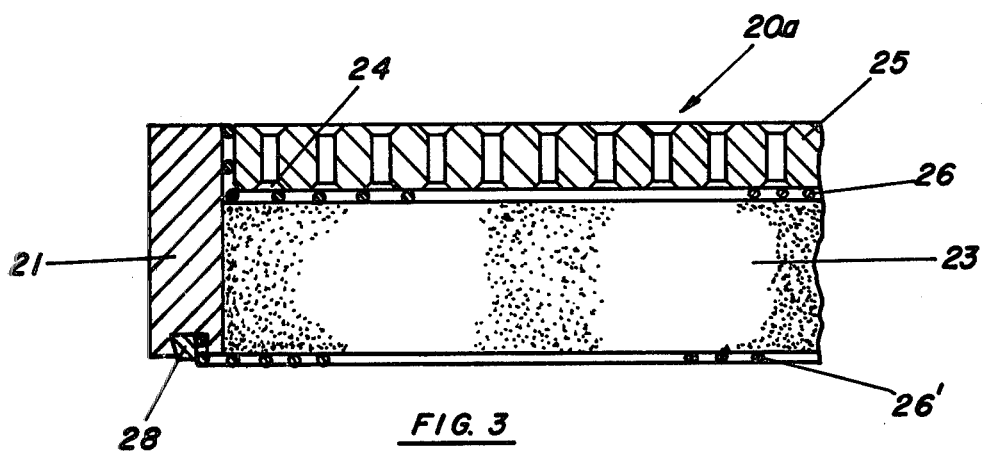
FIG. 3 is a detailed fragmentary view of a filter pack wherein the bottom screen member of the filter pack is conventionally swaged in place and wherein the top screen member of the filter pack forms a press fit in accordance with the present invention.
Figure 5:
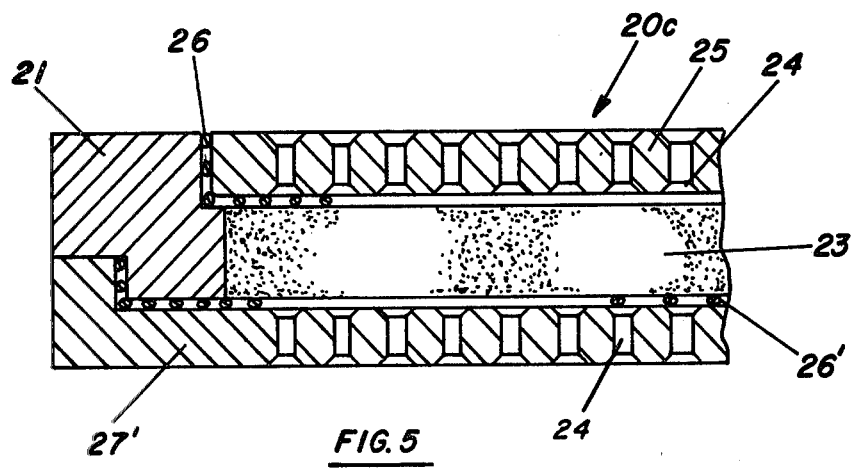
FIG. 5 is a detailed fragmentary view of an alternate embodiment of the present invention.

The filter packs 20a, 20b and 20c of, respectively, FIGS. 3, 4 and 5, all have a first screen member 26 press fitted between a first cover (shown as first distribution plate 25) and filter ring 21.

In filter pack 20a of FIG. 3, the cap is a second screen member 26' which comprises at least one screen having a mesh size which prevents passage of finely divided inert material 23 therethrough but which allows passage of a fluid such as molten polymer therethrough. The second screen member 26' is held in place by an aluminum staking ring 28 which is swaged into a recess provided in filter ring 21.

Filter pack 20b of FIG. 4 is substantially identical to filter pack 20 of FIG. 2 except that flange 22 has been omitted.

In filter pack 20c of FIG. 5, the cap is a second screen member 26' which comprises at least one screen having a mesh size which prevents passage of finely divided inert material 23 therethrough but which allows passage of a fluid such as molten polymer therethrough. Filter pack 20c additionally comprises a second cover which allows passage of a fluid therethrough, depicted as cup-shaped distribution plate 27' with distribution channels 24 in the portion of the plate adjacent to finely divided inert material 23. In this embodiment, a portion of the external periphery of filter ring 21 has a shape similar to but slightly smaller than a matching portion of the internal periphery of the sides of cup-shaped distribution plate 27', and second screen member 26' forms a press fit therebetween.

All of the depicted filter packs have as a common feature the compression of finely divided inert material in the filter pack by the intrusion of at least a screen member and/or distribution plate or cover. In the preferred embodiment, the second cover and second screen member also intrude into the cavity occupied by the finely divided inert material to compress the finely divided inert material.

For those embodiments in which a distribution plate would be located immediately upstream of breaker plate 30, it is desirable to form a distribution space therebetween to avoid having to center the channels of each on one another; this may be accomplished by placing several, preferably three, screens of 20 to 50 mesh, most preferably 50 mesh, between the distribution plate and breaker plate.

The following examples are given to illustrate the present invention and are not to be considered as limiting the scope thereof.

EXAMPLE 1

A filter pack 20 as shown in FIG. 2 was assembled as follows. Filter ring 21 measured on either side of flange 22 had an inner diameter of 5.125 inches (13.02 cms.). Distribution plates 25 and 27 each had outer diameters of 5.110 inches (12.98 cms.) and a thickness of 0.188 inches (0.478 cms.). Screen member 26' comprised two screens, one of 325 mesh which was 0.0035 inch (0.0089 cm.) thick and one of 200 mesh which was 0.005 inch (0.013 cm.) thick, the screens being circular in shape with a diameter of about 5.40 inches (13.7 cms.). Screen member 26' was centered over one of the exposed ends of filter ring 21. Distribution plate 27 was placed on screen member 26' with a 50 mesh screen placed therebetween, and sufficient pressure (approximately 200 psi) was applied by means of a hydraulic press to distribution plate 27 to compress the edges of screen member 26' between the external periphery of distribution plate 27 and the internal periphery of filter ring 21. The 50 mesh screen was 0.009 inch (0.23 cm.) thick and had a diameter of about 5.093 inches (12.94 cms.). Seventy-five grams of silica quartz sand were placed in the cavity formed by filter ring 21, screen member 26' and distribution plate 27. The silica quartz sand was characterized as follows: 10 to 20 percent of the sand would be retained by a number 60 U.S. standard sieve; 75 to 88 percent would be retained by a number 80 U.S. standard sieve; 5 to 15 percent would be retained by a number 120 U.S. standard sieve; and 1½ percent would be retained by a number 140 U.S. standard sieve. A 200 mesh screen, circular in shape and having a diameter of about 5.0 inches (12.7 cms.), was placed on top of the silica sand. Seventy-five grams of glass beads were placed on top of the 200 mesh screen. The glass beads were clean crown glass, soda-lime type, spheres, 90 percent of which would pass through a number 50 U.S. standard sieve but which would be retained by a number 80 U.S. standard sieve. The glass beads were covered by centering screen member 26 thereacross. Screen member 26 comprises 2 screens, each of 200 mesh which were each 0.005 inch (0.013 cm.) thick; the screens were circular in shape with a diameter of about 5.40 inches (13.7 cms.). Distribution plate 25 was placed on screen member 26, and sufficient pressure (about 200 psi) was applied by means of a hydraulic press to distribution plate 25 to simultaneously compress the edges of screen member 26 between the external periphery of distribution plate 25 and the internal periphery of filter ring 21 and cause the intrusion of distribution plate 25 and screen member 26 into the cavity occupied by the finely divided inert material 23 to compress the finely divided inert material 23. The peripheral edges of distribution plates 25 and 27 on either side of flange 22 were beveled at an angle of about 45°.

Filter pack 20 was placed in a spin pot as shown in FIG. 1 with three 50 mesh screens interposed between breaker plate 30 and distribution plate 27. The spin pot was installed in a spinning block and connected to a polymer source at top cap 10.

The layers of filter media (silica sand and glass beads) were evenly distributed and did not shift either during placement of filter pack 20 in the spin pot or during transportation of the spin pot for installation in the spinning block.

EXAMPLE 2

A filter pack 20a as shown in FIG. 3 was assembled as follows. Filter ring 21 had an inner diameter of 5.75 inches (14.6 cms.). Distribution plate 25 had an outer diameter of 5.735 inches (14.57 cms.) and a thickness of 0.125 inches (0.318 cm.). Screen member 26' comprised two screens, one of 200 mesh which was 0.005 inch (0.013 cm.) thick and one of 50 mesh which was 0.009 inch (0.023 cm.) thick, the screens being circular in shape with a diameter of about 6.17 inches (15.7 cms.). Screen member 26' was centered over the grooved end of filter ring 21. Staking ring 28 was placed on screen member 26' with the 50 mesh screen adjacent staking ring 28, and sufficient pressure (approximately 1000 psi) was applied by means of a hydraulic press to staking ring 28 to deform staking ring 28 and thus compress the edges of screen member 26' between the internal periphery of staking ring 28 and the internal periphery of the groove in filter ring 21. One hundred grams of silica quartz sand were placed in the cavity formed by filter ring 21, screen member 26' and staking ring 28. The silica quartz sand was characterized as follows: Ten to 20 percent of the sand would be retained by a number 60 U.S. standard sieve; 75 to 88 percent would be retained by a number 80 U.S. standard sieve; 5 to 15 percent would be retained by a number 120 U.S. standard sieve; and 1½ percent would be retained by a number 140 U.S. standard sieve.

A 200 mesh screen, circular in shape and having a diameter of about 5.75 inches (14.6 cms.), was placed on top of the silica sand. One hundred grams of glass beads were placed on top of the 200 mesh screen. The glass beads were clean crown glass, soda-lime type, spheres, 90 percent of which would pass through a number 50 U.S. standard sieve but which would be retained by a number 80 U.S. standard sieve. The glass beads were covered by centering screen member 26 thereacross. Screen member 26 comprised two screens, one of 325 mesh which was 0.0035 inch (0.0089 cm.) thick and next adjacent to the glass beads, one of 200 mesh which was 0.005 inch (0.013 cm.) thick, the screens being circular in shape with diameters of about 6.0 inches (15.2 cms.). Distribution plate 25 was placed on screen member 26, and sufficient pressure (about 200 psi) was applied by means of a hydraulic press to distribution plate 25 to simultaneously compress the edges of screen member 26 between the external periphery of distribution plate 25 and the internal periphery of filter ring 21, causing the intrusion of distribution plate 25 and screen member 26 into the cavity occupied by the finely divided inert material 23 to compress the finely divided inert material 23. The peripheral edge of distribution plate 25 on the side of flange 22 was beveled at an angle of about 45°.

Filter pack 20a was placed in a spin pot as shown in FIG. 1 with a special distribution plate (not shown) and one 50 mesh screen interposed between breaker plate 30 and the special distribution plate. The spin pot was installed in a spinning block and connected to a polymer source at top cap 10.

The layers of filter media (silica sand and glass beads) were evenly distributed and did not shift either during placement of filter pack 20a in the spin pot or during transportation of the spin pot for installation in the spinning block.

I claim:

1. A filter pack, in which finely divided inert material is bound, for use in a spin pot, comprising:
   a. a wall, defining a cavity in which a finely divided inert material is placed;
   b. a cap, having a plurality of apertures therethrough which are small enough to prevent passage of the finely divided inert material therethrough but which allow passage of a fluid therethrough, and retaining the finely divided inert material in the cavity defined by said wall;
   c. a first cover, allowing passage of a fluid therethrough, a portion of the external periphery of said first cover having a shape similar to but slightly smaller than a matching portion of the internal periphery of said wall; and
   d. a first screen member, press fitted between the portion of the external periphery of said first cover and the portion of the internal periphery of said wall, and covering the exposed portion of the cavity, said first screen member comprising at least one screen having a mesh size which prevents passage of the finely divided inert material therethrough but which allows passage of a fluid therethrough; whereby the finely divided inert material is compressed and held in place in the filter pack by the intrusion of said first cover and said first screen member into the cavity occupied by the finely divided inert material.

2. The filter pack of claim 1 wherein said wall further comprises a flange intermediate the ends of and along the internal periphery of said wall, said cap and said first screen member abutting, respectively, opposing sides of said flange.

3. The filter pack of claim 1 wherein said cap is a second screen member which comprises at least one screen having a mesh size which prevents passage of the finely divided inert material therethrough but which allows passage of a fluid therethrough, the perimeter of said second screen member comprising an aluminum ring which is swaged into a recess provided in said wall.

4. The filter pack of claim 1 wherein said cap is a second screen member which comprises at least one screen having a mesh size which prevents passage of the finely divided inert material therethrough but which allows passage of a fluid therethrough, and wherein the filter pack additionally comprises a second cover which allows passage of a fluid therethrough, said second screen member forming a press fit between said wall and said second cover.

5. The filter pack of claim 4 wherein a portion of the external periphery of said second cover has a shape similar to but slightly smaller than a matching portion of the internal periphery of said wall.

6. The filter pack of claim 5 wherein said wall further comprises a flange intermediate the ends of and along the internal periphery of said wall, said first and said second screen members abutting, respectively, opposing sides of said flange.

7. The filter pack of claim 5 wherein a portion of the external periphery of said wall has a shape similar to but slightly smaller than a matching portion of the internal periphery of said second cover.

8. The filter pack of claim 1 wherein said wall is a filter ring.

9. A filter pack, in which finely divided inert material is bound, for use in a spin pot, comprising:
   a. a filter ring, defining a cavity in which the finely divided inert material is located;
   b. a first distribution plate, having a plurality of apertures therethrough and having an external periphery with a shape similar to but slightly smaller than the internal periphery of said filter ring;
   c. a first screen member, press fitted between said first distribution plate and said filter ring to bind the finely divided inert material at one end of said filter ring, said first screen member having a thickness slightly greater than the distance between the internal periphery of said filter ring and the external periphery of said first distribution plate, said first screen member comprising at least one screen having a mesh size which prevents passage of the finely divided inert material therethrough but which allows passage of a fluid therethrough;
   d. a second distribution plate having a plurality of apertures therethrough and having an external periphery with a shape similar to but slightly smaller than the internal periphery of said filter ring; and
   e. a second screen member, press fitted between said second distribution plate and said filter ring to bind the finely divided inert material at the other end of said filter ring, said second screen member having a thickness slightly greater than the distance between the internal periphery of said filter ring and the external periphery of said second distribution plate, said second screen member comprising at least one screen having a mesh size which prevents passage of the finely divided inert material therethrough but which allows passage of a fluid therethrough; whereby the finely divided inert material is compressed and held in place in the filter pack by the intrusion of said first distribution plate and said first screen member and the intrusion of said second cover and said second screen member into the cavity occupied by the finely divided inert material.

10. The filter pack of claim 9 wherein said filter ring further comprises a flange intermediate the ends of and along the internal periphery of said filter ring, said first and said second screen members abutting respectively, opposing sides of said flange.

11. A method of binding finely divided inert material to form a filter pack for use in a spin pot, comprising the steps of:
   a. substantially filling with a finely divided inert material the cavity formed by a wall and a cap, the cap allowing passage of a fluid therethrough;
   b. covering the finely divided inert material with a screen member which comprises at least one screen having a mesh size which prevents passage of the finely divided inert material therethrough but which allows passage of a fluid therethrough;
   c. placing a cover on the screen member, a portion of the external periphery of the cover having a shape similar to but slightly smaller than a matching portion of the internal periphery of the wall, the cover allowing passage of a fluid therethrough, the screen member having a thickness slightly greater than the distance between the periphery of the cover and the periphery of the wall; and
   d. applying suffcient pressure to the cover to simultaneously compress the edges of the screen member between the portion of the external periphery of the cover and the portion of the internal periphery of the wall and cause the intrusion of the cover and the screen member into the cavity occupied by the finely divided inert material to compress and bind the finely divided inert material in place.

12. A method of binding a finely divided inert material to form a filter pack for use in a spin pot, comprising the steps of:
   a. covering one end of a cavity formed by a wall open at both ends with a first screen member which comprises at least one screen having a mesh size which prevents passage of a finely divided inert material therethrough but which allows passage of a fluid therethrough;
   b. placing a first cover, which has an external periphery with a shape similar to but slightly smaller than the internal periphery of the wall and which allows passage of a fluid therethrough, over the first screen member, the first screen member having a thickness slightly greater than the distance between the external periphery of the first cover and the internal periphery of the wall;
   c. applying sufficient pressure to the first cover to compress the edges of the first screen member between the external periphery of the first cover and the internal periphery of the wall;
   d. substantially filling with finely divided inert material the cavity formed by the wall, the first screen member, and the first cover;
   e. covering the finely divided inert material with a second screen member which comprises at least one screen having a mesh size which prevents passage of the finely divided inert material therethrough but which allows passage of a fluid therethrough;
   f. placing a second cover, which has an external periphery with a shape similar to but slightly smaller than the internal periphery of the wall and which allows passage of a fluid therethrough, over the second screen member, the second screen member having a thickness slightly greater than the distance between the external periphery of the second cover and the internal periphery of the wall; and
   g. applying sufficient pressure to the second cover to simultaneously compress the edges of the second screen member between the external periphery of the second cover and the internal periphery of the wall and cause the intrusion of the second cover and the second screen member into the cavity occupied by the finely divided inert material to compress and bind the finely divided inert material in place.

* * * * *